United States Patent [19]

Sakoe

[11] 4,239,936
[45] Dec. 16, 1980

[54] SPEECH RECOGNITION SYSTEM

[75] Inventor: Hiroaki Sakoe, Tokyo, Japan

[73] Assignee: Nippon Electric Co., Ltd., Tokyo, Japan

[21] Appl. No.: 974,274

[22] Filed: Dec. 28, 1978

[30] Foreign Application Priority Data

Dec. 28, 1977 [JP] Japan ............................. 52-157966
Dec. 28, 1977 [JP] Japan ............................. 52-157967
Dec. 28, 1977 [JP] Japan ............................. 52-157969

[51] Int. Cl.³ .......................... G10L 1/00; H03G 3/32
[52] U.S. Cl. .................................. 179/1 SD; 179/1 P
[58] Field of Search ............... 179/1 SD, 1 P, 1 VC, 179/1 VL

[56] References Cited

U.S. PATENT DOCUMENTS

| 3,934,084 | 1/1976 | Munson et al. | 179/1 P |
| 4,028,496 | 6/1977 | La Marche et al. | 179/1 SC |
| 4,032,710 | 6/1977 | Martin et al. | 179/1 SC |
| 4,044,309 | 8/1977 | Smith | 179/1 VL |
| 4,059,725 | 11/1977 | Sakoe | 179/1 SD |
| 4,063,031 | 12/1977 | Grunza | 179/1 SD |

Primary Examiner—Malcolm A. Morrison
Assistant Examiner—E. S. Kemeny
Attorney, Agent, or Firm—Sughrue, Rothwell, Mion, Zinn and Macpeak

[57] ABSTRACT

A speech recognition system adaptable to noisy environments is disclosed. The system includes a recognition unit for recognizing input speech signals and a noise measuring unit for measuring the intensity of ambient noises. The system also includes a rejection unit responsive to a rejection standard controlled by the intensity of the measured noise for rejecting the rejection results given from the recognition unit when the rejection standard is exceeded.

7 Claims, 14 Drawing Figures

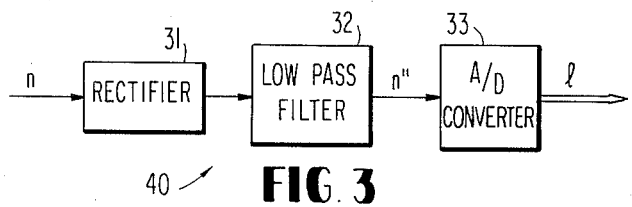
FIG.3
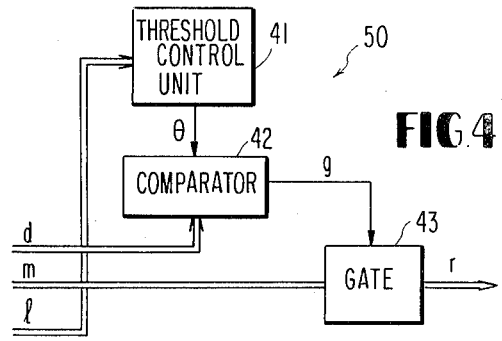
FIG.4
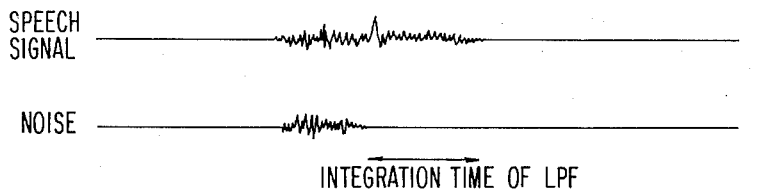
FIG.5A
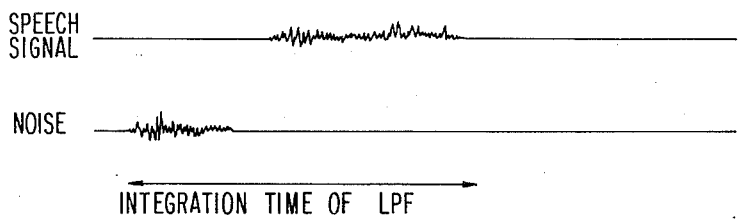
FIG.5B
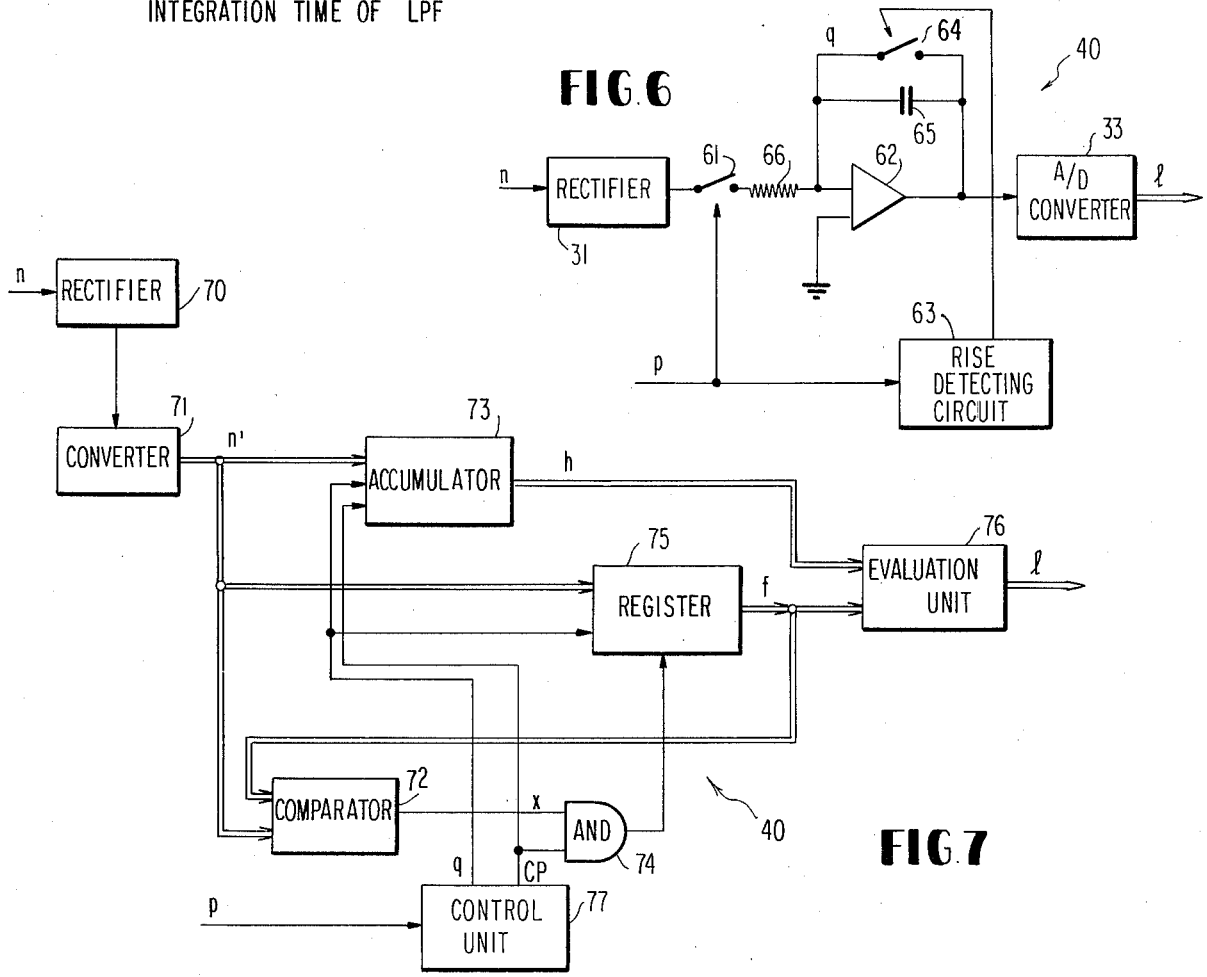
FIG.6
FIG.7

SPEECH RECOGNITION SYSTEM

BACKGROUND OF THE INVENTION

This invention relates to an improvement in a speech recognition system.

Extensive applications of speech recognition systems responsive to an input oral or speech signal can be found in data input means for computers as well as control information input means for various machines. Recently, speech recognition systems have come to be put into practical use to feed routing information into automatic package sorting machines or various inspection data into computers at automobile factories or elsewhere as described by Thomas B. Martin in the article entitled "Practical Applications of Voice Input to Machines" published in the *Proceedings of the IEEE*, Vol. 64, No. 4, April 1976, pp. 487 to 501.

Such a conventional speech recognition system determines time segments, in which an oral input signal is present (referred to as speech signal durations hereunder), by converting the input signal into an electrical signal with the use of a microphone and by monitoring the amplitude of said electrical signal so that a speech recognition may be achieved through spectrum analysis and recognition of the electrical signal given in said speech signal duration.

No problem will be caused if such speech recognition system is used under a quiet environment, whereas it is vulnerable to misrecognition under a noisy environment. Namely, when intensive noise is generated while the oral input signal is being given, the speech spectrum superimposed with a noise spectrum of substantial amplitude may be distorted, and the input signal may be recognized differently from what it is intended to be. In this case, if the erroneous recognition is conveyed to the machine to be controlled (for example, a package sorting machine), the machine will cause a faulty operation. To avoid such a disadvantage, those speech recognition systems are so designed as to reject the erroneous recognition results whose apparent accuracy fails to satisfy a certain standard (hereinafter called the rejection standard). More in detail, in the conventional speech recognition system, such a rejection standard is kept unchanged once it is preset. If this standard is too loose, the above-mentioned misrecognition frequently occurs under a noisy environment, or if it is too strict, the recognition result of a slightly inarticulate speech signal may be rejected even under a quiet environment. On the other hand, it is possible to select in advance and fix the optimum rejection standard if the intensity of noise is constant, but the noise generating conditions will change every moment under an actual environment as affected by ambient noise due to a start or stop operation of a motor, a typewriting operation, or a telephone call.

SUMMARY OF THE INVENTION

An object of the present invention is therefore to provide a convenient speech recognition system adaptable to noisy environments and free from the above-mentioned disadvantages in a prior art.

The present system comprises a recognition unit for recognizing input speech signals, means for measuring the intensity of ambient noises, and a rejection unit responsive to a rejection standard controlled by the intensity of said noise measured by said noise-intensity measuring means for rejecting the recognition results given from said recognition unit when the rejection standard is exceeded.

The present system comprises a first microphone for picking up input speech signals; a speech-signal-duration determining unit for determining speech signal durations by monitoring the amplitude of the input speech signals; a recognition unit for determining recognition results by analyzing and recognizing signals given in said speech signal durations; a second microphone provided to pick up ambient noises; means for measuring the intensity of input signals given from said second microphone; and a rejection unit which, when the intensity of said noise exceeding a predetermined standard value is detected in any of said speech signal durations, rejects the recognition results determined by said recognition unit.

The present system is composed of a speech microphone provided to pick up input speech signals; means for calculating the amplitude of the speech signals picked up by said speech microphone; a noise microphone provided to pick up ambient noises; means for calculating the intensity of the noises picked up by said noise microphone; a speech-signal detecting unit for determining speech signal durations by monitoring the amplitude of said speech signals compensated for by the intensity of said noises; a recognition unit for recognizing said input speech signals given in speech signal durations; and a rejection unit which, when the intensity of said noise exceeding a predetermined standard value is detected in any of said speech signal durations, rejects the recognition results determined by said recognition unit.

Thus, the present invention permits the realization of an efficient speech recognition system capable of strictly rejecting the misrecognition results under a noisy environment with less rejection under a quiet environment.

BRIEF DESCRIPTION OF THE DRAWINGS

This invention will be described in detail in conjunction with the accompanying drawings in which:

FIGS. 2 through 4 are detailed drawings illustrating a part of the embodiment;

FIGS. 5A and 5B illustrate the positional relationship between a speech signal and noise on the time axis;

FIGS. 6 and 7 illustrate other structural examples of the noise measuring unit;

DESCRIPTION OF THE PREFERRED EMBODIMENTS

Figure 1A:
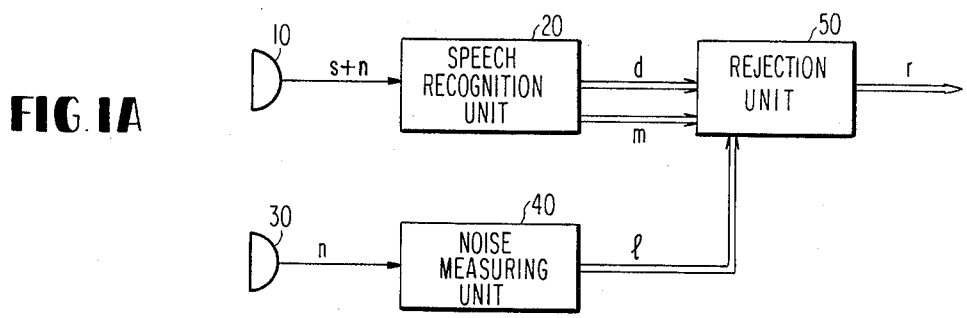
FIG. 1A is a block diagram illustrating one embodiment of this invention.

In the drawings, thick lines represent signal lines for 12-bit parallel digital signals and thin lines, those for either 1-bit digital signals or analog signals. Further, signals and signal lines may be sometimes represented by the same terms.

Referring to FIG. 1A, an analog speech signal s supplied through microphone 10 given to a recognition unit 20. The unit 20 performs the spectrum-analyzing operation of the signal, the detection operation of a speech signal duration and the recognition operation. Upon completion of these operations, the unit 20 feeds a rejection unit 50 with a word name m as a recognition result and a signal d indicative of the apparent accuracy of said recognition result. Meanwhile, a noise signal n picked up by a microphone 30 (provided mainly to pick up ambient noises) is supplied to a noise measuring unit 40 which measures the power level of the noise signal n and supplies a signal l to said rejection unit 50. The rejection unit 50 is so composed as to assess the signal d given from the recognition unit 20 and determine whether or not the recognition result m should be rejected using the rejection standard made variable by the controlling noise intensity signal l. Said units 20, 40 and 50 can be realized in either analog or digital circuits. The following description will mainly concern an example composed of digital circuits with reference to FIG. 2 and the succeeding drawings.

Figure 1B:
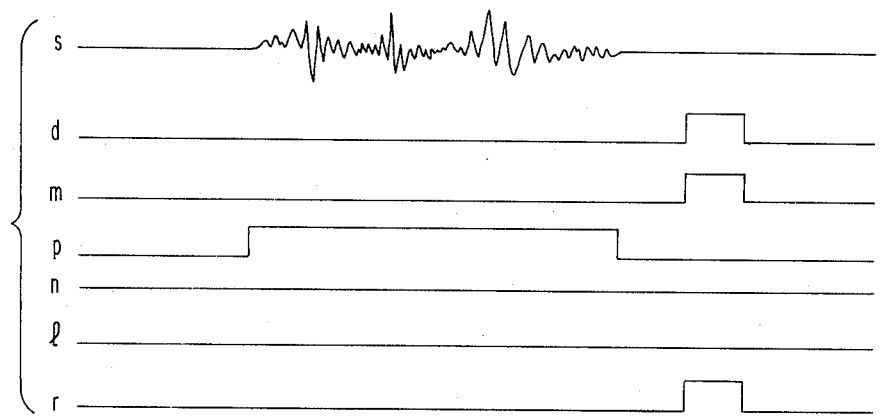
FIGS. 1B and 1C are time charts illustrating the operations of the embodiment.
Figure 1C:
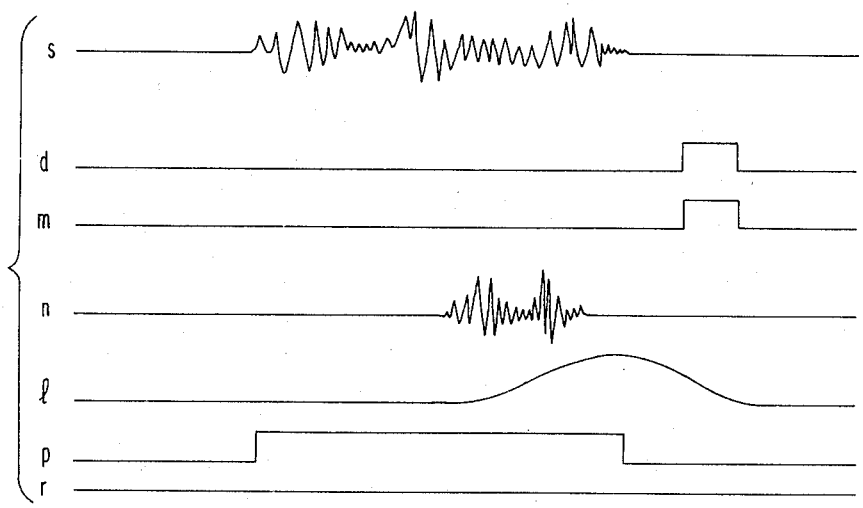
Figure 2:
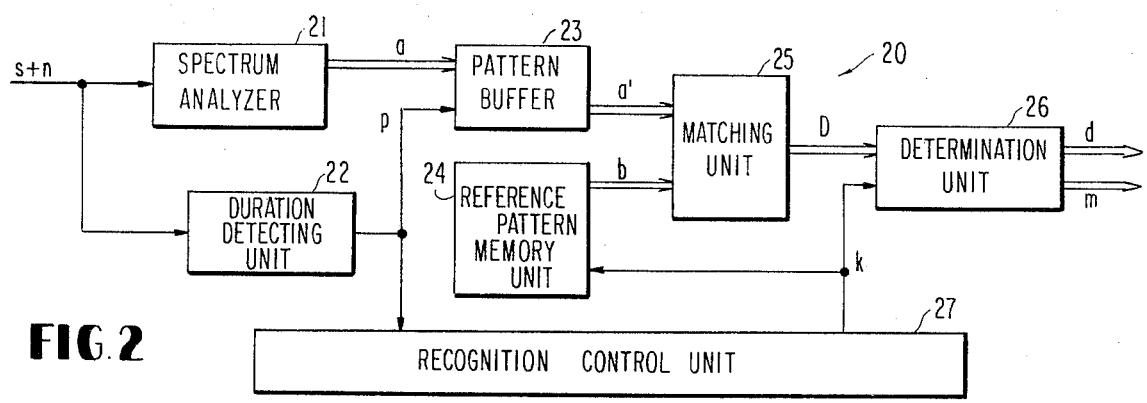

FIG. 2 illustrates one example of the recognition unit 20 based on the known pattern matching method. The analyzer 21 in FIG. 2 consists of a channel filter type spectrum analyzer like the one shown in FIG. 1 of the article by Louis C. W. Pols entitled "Real-Time Recognition of Spoken Words" published in the *IEEE Transactions on Computers*, Vol. C-20, No. 9, September 1971, pp. 972 to 978.

Analog speech signal waves supplied from the signal lines s in FIG. 2 undergo the spectrum analysis and analog-to-digital conversion, are time-sampled in predetermined analysis periods (for instance, 10 milliseconds) and fed, as a time series of spectrum vectors $$a_i = a_{1i}, a_{2i}, \ldots, a_{10i} \tag{1}$$

consisting of spectrum components in the respective channels, to an input pattern buffer 23 through a signal line a. A speech-signal-duration detecting unit 22 may be comprised of the one described in U.S. Pat. No. 3,712,959 to calculate the power levels of speech signal waves given from said signal line s, and to determine as speech-signal durations those time segments whose power levels exceed a predetermined threshold value. During such time segments the speech-signal-duration detecting signal p is kept at "1," and spectrum vectors $a_i$ of Equation (1) are written into the input pattern buffer 23. At a time point when a speech signal duration has been terminated and said signal p has been returned to "0," the pattern describing the input signal (hereinafter called input pattern)

$$A = a_1, a_2, \ldots, a_I \tag{2}$$

is still retained in the buffer 23. Immediately after a recognition control unit 27 receives the signal p indicative of the termination of a speech signal duration, a counter built in the unit 27 changes the word designation signal k from 1 to M, where M represents the number of words to be designated. The reference pattern for each applicable word is stored in advance in a reference pattern memory unit 24. Similarly to the input patterns A, the reference patterns are represented as follows:

$$B^k = b_1{}^k, b_2{}^k, \ldots, b_j{}^k, \ldots, b_{Jk}{}^k \tag{3}$$

As soon as a word designation signal k is given from said recognition control unit 27, a corresponding reference pattern $B^k$ is supplied as an output in the form of a signal b. A matching unit 25 calculates the similarity measure $S(A, B^k)$ between the input pattern A (Equation (2)) supplied from the input pattern buffer 23 through a signal line a' and the reference pattern $B^k$ (Equation (3)) supplied from the reference pattern memory unit 24 through another signal line b. For a practical example of this matching unit 25, one having a time normalizing capability like that shown in FIG. 4 of the U.S. Pat. No. 3,816,722 is effective. The similarity measure $S(A, B^k)$ so calculated is fed as a signal D to a determination unit 26. The word designation signal K from said unit 27 is successively varied from 1 to M and, in accordance with this variation, M similarity measure signals D, from $S(A, B^l)$ to $S(A, B^M)$, are calculated. The determination unit 26 selects as a similarity measure signal d the maximum value of the similarity measures $S(A, B^k)$ successively fed to it, and supplies as an output signal m the word designation signal k which gives this maximum value. The input pattern A is thus determined to be the closest to the word assigned the name of m. Since the similarity measure signal d indicates the measure of similarity between the input pattern A and the reference pattern $B^m$, the greater this value is, the more accurate this determination will be.

Next, referring to FIG. 3, a specific example of the noise measuring unit 40 will be described. The analog ambient noise signal n given through a signal line n is rectified by a rectifier circuit 31, digitized by an analog-to-digital converter 33 after being smoothed by a low pass filter 32 having an appropriate time constant (for instance, 200 milliseconds), and supplied as a noise intensity signal l to the rejection unit 50 of FIG. 1.

FIG. 4 illustrates an example of the rejection unit 50. This rejection unit 50 compares the similarity measure signal d with the threshold value $\theta$ and, if d is found smaller than $\theta$, rejects the recognition result by reason of insufficient similarity between the input pattern A and the reference pattern $B^m$. The noise intensity signal l is fed into a threshold value control unit 41. This control unit 41 may be composed of a read-only memory. In this instance, the noise intensity signal l is given as an address designation signal. At the designated address is stored the most suitable threshold value for that signal l, and the threshold value $\theta$ is thus read out. The similarity measure signal d fed from the recognition unit 20 and the threshold value $\theta$ given from the threshold value control unit 41 is compared in a comparator circuit 42. The circuit 42 keeps the gate signal g at "0" if d is smaller than $\theta$ or at "1" if d is equal to or greater than $\theta$. A gate circuit 43 into which a word name m has been supplied as the determination result from the recognition unit 20, supplies this word m as an output signal r or, if the gate signal g is 0, is closed to prevent the signal r from being supplied as output.

Thus, the present invention permits the achievement of a speech recognition system adaptable for the conditions of ambient noises.

FIGS. 1B and 1C are time charts briefly illustrating the operations of the present system based on the above-mentioned rejection procedure, and respectively correspond to the instances where ambient noises are absent and present. The signal l, which actually is digital, is indicated as an analog signal in the charts.

Although description on the threshold value $\theta$ was made before, in a strict situation not permitting misrecognition, the rejection must be achieved based on an increasingly strict standard with a rise in the ambient noise intensity. More in detail, the threshld value $\theta$ should be increased with a rise in the noise intensity. However, since the rejection requires re-entry of a speech signal, the overall input speed is degraded. Therefore, if the speed must be maintained at a certain value even at some risk of misrecognition, it is more advantageous to achieve the rejection based on an increasingly loose standard. In this instance, the control should be so effected as to bring down the threshold value $\theta$ with a rise in the noise intensity. It is also possible to combine these two methods and give a convex pattern to the rejection characteristic. Controlling the threshold value $\theta$ with the read-only memory 41 shown in FIG. 4 is a convenient method because any desired rejection characteristic can be obtained merely by changing the contents of the memory 41.

Also, though an example in which the noise intensity is detected with a low pass filter having a certain integration time was described with reference to FIG. 3, it results in shortcomings indicated in FIGS. 5A and 5B. Namely, if the integration time of the low pass filter is too short as shown in FIG. 5A, a noise generated near the beginning of a speech signal duration will be outside of the integration time and accordingly, not be detected. Conversely, if the integration time is too long as shown in FIG. 5B, even a noise outside of a speech signal duration will be detected.

FIG. 6 illustrates an example of the noise measuring unit improved in this respect. A switch 61 is connected only when the detection signal p supplied from the speech-signal-duration detecting unit 22 of FIG. 2 is "1", i.e., only during speech signal durations. An operational amplifier 62 together with a resistor 66 and a condenser 65 constitutes an integrating circuit. At the beginning of a speech signal duration, a starting point q is generated by a rise detecting circuit 63 at the rising time point of the detection signal p, and the pulse instantaneously closes a switch 64, thereby resetting this integrating circuit. Thereafter, as long as said signal p is "1," the unit-time amplitude values of the noise signal n are integrated. Therefore, at the time point when a speech signal duration has been terminated, a quantity corresponding to the aggregate power of the noises which arose during the speech signal duration is retained in the integrating circuit. This value is converted by an analog-to-digital converter 33 into a digital signal value which is supplied as the noise intensity signal l to the rejection unit 50. What distorts a speech signal pattern is limited to what is synchronously generated in the speech signal duration, and noises are detrimental wherever they may arise in the speech signal duration. The structure of FIG. 6, which makes it possible to integrate and detect all the noises only present in speech signal durations, is free from the shortcomings illustrated in FIGS. 5A and 5B.

Referring to FIG. 7 which illustrates a further improved digital noise measuring unit 40, the analog ambient signal noise n, after being rectified by a rectifier circuit 70, is converted by an analog-to-digital converter 71 into a noise signal n' digitized in synchronism with a sampling period of, for instance, 80 microseconds. Into a control unit 77 is given the detection signal p fed from the detecting unit 22 of FIG. 2, and at the rising time point of this signal is generated a reset signal q. The contents of both an accumulator 73 and a register 75 are reset to "0" by this reset signal q. In the time segments where said signal p is "1," i.e., speech signal durations, a clock pulse cp is generated from a control unit 70 in synchronism with said sampling periods. The accumulator 73 performs an integration of said noise signals n' in synchronism with this clock pulse cp. Therefore, at the time point when a speech signal duration has been terminated, a value (called the aggregate quantity of noises) proportional to the combined power of noises which arose during the speech signal duration is stored in the accumulator 73. Meanwhile a comparator 72 and the register 75 function to detect the maximum intensity of noise in speech signal durations. At every sampling time point, the contents f of the register 75 and the noise signal n' at the same point are compared, and a signal x is set to "1" only when n' is greater than f. At this time, a clock pulse cp supplied from the control unit 77 passes an AND gate 74 and is given as a write-in pulse for the register 75. Thus, in the register 75 is stored the maximum amplitude value of the noise signal n' from the beginning of a speech signal duration until every sampling point. When a speech signal duration has been terminated, the maximum amplitude value of noises which arose during this speech signal duration is stored in the register 75 as the signal f. An overall evaluation unit 76 evaluates on an overall basis the aggregate quantity of noises n in a speech signal duration given by the integrator 73 and the maximum noise intensity f in the speech signal duration given by the register 75, calculates a noise intensity signal l as a quantity indicative of the substantially detrimental effect on recognition, and supplies this signal l to the rejection unit 50. The relationship among the aggregate quantity of noises h, the maximum noise intensity f and the signal l may be what is represented by the following linear equation:

$$l = h + \alpha \cdot f \qquad (4)$$

where $\alpha$ is a predetermined coefficient.

Generally, impulsive noises are more liable than constant noises to cause a misrecognition even if they are equal in aggregate quantity. For example, if short but high amplitude noise occurs concurrently with the $|g|$ sound of $|kanagawa|$ while the word is being pronounced, it is likely to be mistaken for $|kanazawa|$. Even in such case, a noise measuring unit which, like the one illustrated in FIG. 7, is capable of detecting the unit-time maximum amplitude value of noises, can achieve an accurate rejection.

Although the rejection unit 50 of the above described embodiment is supposed to detect the maximum value d of the similarity measure and accomplish the rejection on that basis, it may sometimes be more desirable to take into account the difference between the maximum value d and the second maximum value d'. If the difference between the maximum value d and the second maximum value d' of the similarity measure obtained when a unit speech signal is inputted is smaller than a threshold value $\delta$, the recognition result m should be rejected on the basis of the fact that this input is about equally close to two words. In this instance, it is more effective to have the threshold value $\delta$ also controlled by the noise intensity signal l. While in the above described embodiment the recognition unit 20 is supposed to base its determination on the similarity measure S (A, $B^k$) between the input pattern and the reference pattern, the determination can as well be based on the distance between the input pattern A and the reference pattern B. In this case, relationship of magnitude should be reversed.

Figure 8:
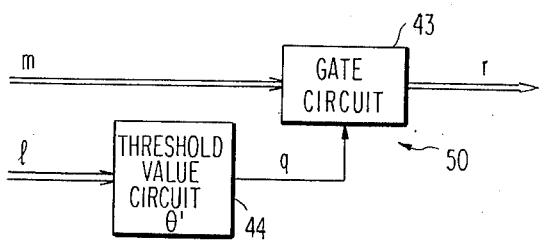
FIG. 8 is a typical rejection unit for use in one embodiment of this invention.

Referring to FIG. 8 which illustrates a simplified rejection unit 50, said noise intensity signal l is given to a threshold value circuit 44, in which its own threshold value $\theta'$ is set in advance, and compared with this threshold value $\theta'$. If l is greater than $\theta'$, the gate signal g is set to "0" to close the gate circuit 43, thereby preventing the recognition result m from being supplied as an output signal r. If l is either equal to or smaller than $\theta'$, the gate signal g is set to "1" to open the gate circuit 43, thereby allowing the recognition result m to be supplied as an output signal r. The rejection unit of FIG. 8 has an advantage of highly simplified hardware and further is effective when used as a recognition unit operating by a recognition method which, unlike the embodiment illustrated in the drawings up to FIG. 7, does not rely on the pattern matching by the use of the similarity measure or distance. Namely, it is applicable to the decision tree-based recognition method described in the article by M. R. Sambur and L. R. Rabiner entitled "A Speaker-Independent Digit-Recognition System" published in the *Bell System Technical Journal*, Vol. 54, No. 1, January 1975, pp. 81 to 102.

Figure 11:
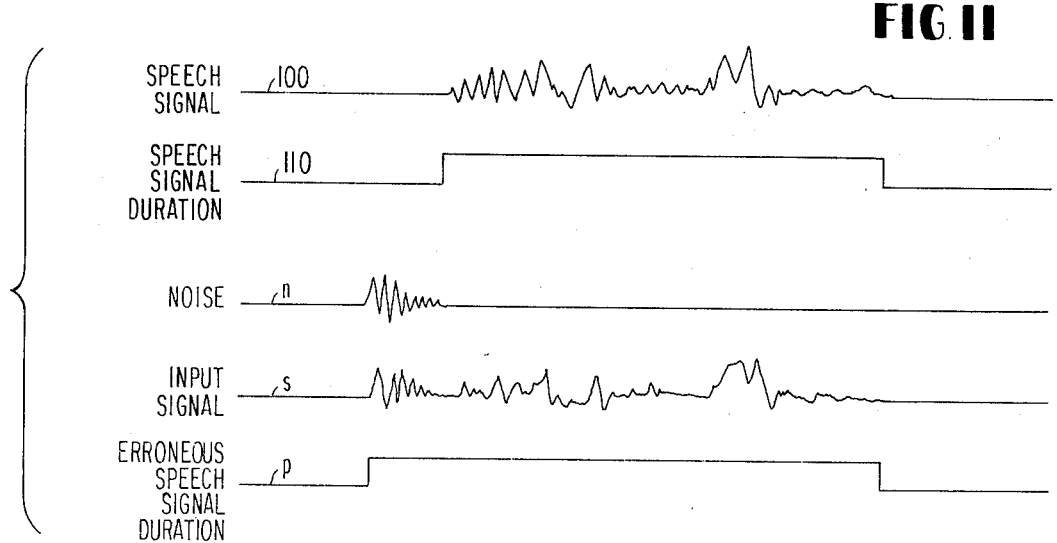
FIG. 11 shows the operations of the units depicted in FIGS. 9 and 10.

The present recognition system described above with reference to FIGS. 1A through 8 involves the problem illustrated in FIG. 11. The true duration of the speech signal referred to as numeral 100 should be what is indicated by reference number 100. However, if noise n is generated in the close vicinity of the beginning or end of the speech signal, a speech signal detection signal p which also includes the noise is generated. The noise measuring unit 40 of FIGS. 6 and 7, which is so composed as to operate in those time segments where the speech signal detection signal p is held at "1," detects said noise. Consequently, the speech signal s then inputted will be rejected. This is a rejection resulting from erroneous detection of the speech signal duration, and can be prevented if the duration is correctly detected as indicated by reference number 110 in FIG. 11. If the speech signal duration is like 110, noise n will not be detected and a speech signal involving no noise will be recognized, so that a correct recognition result may be supplied as the output, instead of being rejected.

Figure 9:
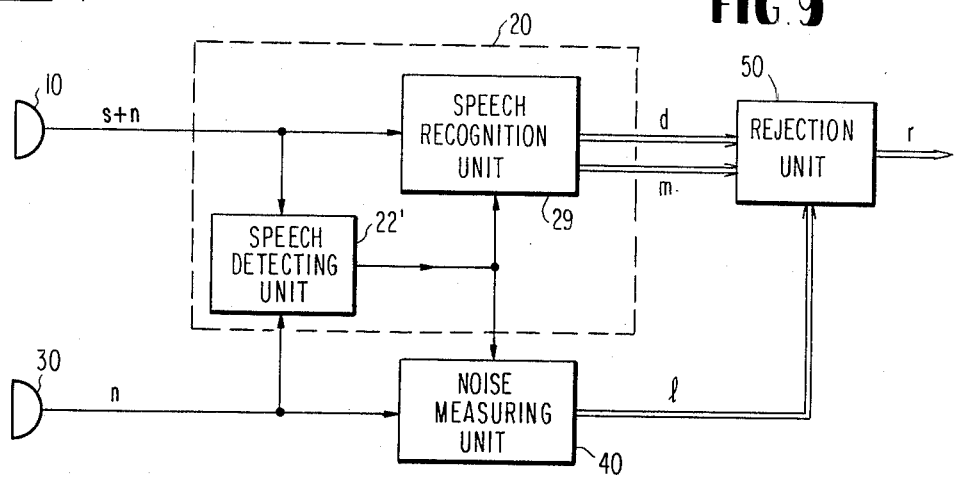
FIGS. 9 and 10 show diagrams for illustrating a second embodiment of this invention.

FIG. 9 shows another embodiment made taking the foregoing into consideration.

A speech signal s inputted from the microphone 10 and an ambient noise signal n from the microphone 30 are given to the speech signal detecting unit 22' build in the recognition unit 20, the remaining components of which shown in FIG. 2 are represented by block 29. The unit 22' performs its speech signal detection on the basis of a signal obtained after compensating for the ambient noise signal component involved in the speech signal s depending on the level of the ambient signal n.

Figure 10:
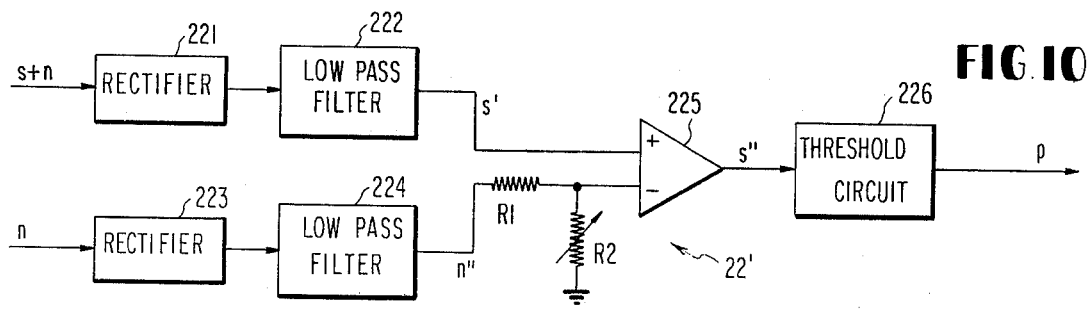

Referring to FIG. 10 which illustrates an example of the detecting unit 22', the speech signal s is rectified, smoothed and converted into a speech intensity signal s' by a rectifier 221 and a low pass filter 222, respectively. Meanwhile, the ambient noise signal n is rectified, smoothed and converted into a noise intensity signal n" by a rectifier 223 and a low pass filter 224, respectively. If, as shown in FIG. 3, the noise measuring unit 40 includes a recititfier and a low pass filter, they can be commonly used as the rectifer 223 and low pass filter 224. Said speech intensity signal s' and noise intensity signal n" are fed into a differential amplifier 225 in which the noise component included in the signal s' is substracted. A signal s" thereby obtained is given to a threshold circuit 226 in which a threshold value $T_H$ for speech signal detection is set in advance. The speech detection signal p is set to "1" only when s" is either greater than or equal to $T_H$. The noise intensity signal n" is divided by variable resistances R1 and R2, and given at its optimum level to the differential amplifier 225.

The embodiment described referring to FIGS. 9 and 10 can prevent rejections resulting from erroneous detection in speech signal durations, and consequently realize a speech recognition system having a response rate of high accuracy.

What is claimed is:

1. A speech recognition system comprising:
   a first microphone for picking up input speech signals;
   a speech-signal-duration determining unit for determining speech signal durations by monitoring the amplitude of the input speech signals;
   a recognition unit for determining recognition results by analyzing and recognizing signals given in said speech signal durations;
   a second microphone provided to pick up ambient noises;
   means for measuring the intensity of input signals given from said second microphone; and
   a rejection unit which, when the intensity of said noise exceeding a predetermined standard value is detected in any of said speech signal durations, rejects the recognition results determined by said recognition unit.

2. A speech recognition system as recited in claim 1, wherein said recognition unit comprises:
   analyzer means for receiving said input speech signals and generating a digital output representing a time series of spectrum vectors;
   buffer means receiving the digital output of said analyzer means for temporarily storing said digital output in response to an output from said speech-signal-duration determining unit;
   reference pattern memory means for digitally storing reference patterns represented by a plurality of time series of spectrum vectors; and
   means for matching the contents of said buffer means with one of the reference patterns stored in said reference pattern memory means and generating a recognition output and a similarity measure signal.

3. A speech recognition system as recited in claim 2, wherein said noise-intensity measuring means comprises:
   a rectifier connected to receive input signals from said second microphone;
   resettable integrator means for integrating an input signal;
   switch means responsive to the output of said speech-signal-duration determining unit for connecting the output of said rectifier to the input of said resettable integrator means; and
   means responsive to a rise in the output of said speech-signal-determining unit for resetting said resettable integrator means.

4. A speech recognition system as recited in claim 2, wherein said noise-intensity measuring means comprises:
   converter means connected to receive input signals from said second microphone for providing a digital output;
   accumulator means connected to receive the digital output from said converter means and integrate successive digital outputs by accumulating the same;

register means connected to receive and temporarily store a digital output from said converter means;

comparator means for comparing the outputs of said converter means and said register means to detect the maximum intensity of noise in speech signal durations and generate an output signal to said register means to control the input of digital signals thereto;

means responsive to a rise in the output of said speech-signal-determining unit for resetting both said accumulator means and said register means; and evaluation means responsive to the contents of said accumulator means and said register means for an output signal representing ambient noise intensity.

5. A speech recognition system as recited in claim 1, wherein said rejection unit comprises:

threshold circuit means for comparing the output of said noise-intensity measuring means with a preset threshold and generating a gating signal; and gate means responsive to said gating signal for selectively rejecting the output of said recognition unit.

6. A speech recognition system comprising:

a speech microphone provided to pick up input speech signals;

means for calculating the amplitude of the speech signals picked up by said speech microphone;

a noise microphone provided to pick up ambient noises;

means for calculating the intensity of the noises picked up by said noise microphone;

a speech-signal detecting unit for determining speech signal durations by monitoring the amplitude of said speech signals compensated for by the intensity of said noises;

a recognition unit for recognizing said input speech signals given in speech signal durations; and a rejection unit which, when the intensity of said noise exceeding a predetermined standard value is detected in any of said speech signal durations, rejects the recognition results determined by said recognition unit.

7. A speech recognition system comprising:

a first microphone for picking up input speech signals;

a speech-signal-duration determining unit for determining speech signal durations by monitoring the amplitude of the input speech signals;

a recognition unit for determining recognition results by analyzing and recognizing signals given in said speech signal durations, having analyzer means for receiving said input speech signals and generating a digital output representing a time series of spectrum vectors, buffer means receiving the digital output of said analyzer means for temporarily storing said digital output in response to an output from said speech-signal-duration determining unit, reference pattern memory means for digitally storing reference patterns represented by a plurality of time series of spectrum vectors, and matching the contents of said buffer means with one of the reference patterns stored in said reference pattern memory means and generating a recognition output and a similarity measure signals;

a second microphone provided to pick up ambient noises;

means for measuring the intensity of input signals given from said second microphone; and a rejection unit for rejecting the recognition results by said recognition unit, having threshold control means for setting a threshold value in response to the output of said noise intensity measuring means, comparator means receiving said similarity measure signal from said matching means and comparing said similarity measure signal with said threshold value for generating a gating signal, and gate means responsive to said gating signal for selectively passing said recognition output from said matching means.

* * * * *

UNITED STATES PATENT AND TRADEMARK OFFICE
CERTIFICATE OF CORRECTION

PATENT NO. : 4,239,936

DATED : December 16, 1980

INVENTOR(S) : Hiroahi SAKOE

It is certified that error appears in the above—identified patent and that said Letters Patent is hereby corrected as shown below:

Column 3, line 46, delete "$\alpha_1$" and insert -- $a_1$ -- ;

line 64, delete "bJk$^k$" and insert -- $b_{J_k}^{\ k}$ -- .

Column 6, line 12, after "same" insert -- time -- .

Column 7, line 27, delete "100" and insert -- 110 -- .

Signed and Sealed this

Fourteenth Day of April 1981

[SEAL]

Attest:

RENE D. TEGTMEYER

*Attesting Officer*    *Acting Commissioner of Patents and Trademarks*